United States Patent
Odenwald, Jr.

(10) Patent No.: US 6,310,884 B1
(45) Date of Patent: Oct. 30, 2001

(54) DATA TRANSFER METHOD AND APPARATUS THAT ALLOCATE STORAGE BASED UPON A RECEIVED RELATIVE OFFSET

(75) Inventor: Louis H. Odenwald, Jr., Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/082,996

(22) Filed: May 21, 1998

(51) Int. Cl.[7] .................................................. H04L 12/54
(52) U.S. Cl. ............................................ 370/412; 370/471
(58) Field of Search ................................... 370/389, 394, 370/412, 413, 415, 417, 422, 428, 429, 470, 471, 472, 473, 474; 710/30, 52, 56; 709/236

(56) References Cited

U.S. PATENT DOCUMENTS

| | | | |
|---|---|---|---|
| 5,136,584 | * 8/1992 | Hedlund | 370/399 |
| 5,243,596 | * 9/1993 | Port et al. | 370/231 |
| 5,260,933 | 11/1993 | Rouse | 370/14 |
| 5,410,546 | 4/1995 | Boyer et al. | 371/37.1 |
| 5,430,842 | 7/1995 | Thompson et al. | 395/200 |
| 5,500,864 | 3/1996 | Gonia et al. | 371/53 |
| 5,588,000 | 12/1996 | Rickard | 370/428 |
| 5,603,064 | 2/1997 | Bennett | 395/872 |
| 5,610,745 | 3/1997 | Bennett | 359/139 |
| 5,619,497 | 4/1997 | Gallagher et al. | 370/394 |
| 5,638,518 | 6/1997 | Malladi | 395/200 |
| 5,649,189 | 7/1997 | Cook | 395/612 |
| 5,651,002 | * 7/1997 | Seters et al. | 370/392 |
| 5,663,952 | 9/1997 | Gentry, Jr. | 370/252 |
| 5,757,804 | * 5/1998 | McGee | 370/510 |
| 6,034,962 | * 3/2000 | Ohno et al. | 370/399 |

OTHER PUBLICATIONS

Inside Fibre Channel; Intelligent Solutions, Inc; Sep. 12, 1997; pp. 1–7.
Fibre Channel; Strategic Information Resources; Sep. 12, 1997; pp. 1–10.
Three New Patents Permitted for Emulex Fibre Channel Gigabit Technology and Products; Emulex Press Release; Sep. 12, 1997; pp. 1–2.
Tachyon Fibre Channel Controller Chip; Hewlett Packard; Dec. 1995; pp. 1–294; and in particular pp. 99–102.

* cited by examiner

Primary Examiner—Kwang B. Yao

(57) ABSTRACT

A method of using a frame sequence to transmit a data block from a transmitting device to a receiving device is disclosed. One step of the method includes generating a first frame of the frame sequence that includes a last portion of the data block and a relative offset which indicates a relative displacement between a first portion of the data block and the last portion of the data block. Another step of the method includes generating a second frame of the frame sequence that includes the first portion of the data block. The method also includes the step of transmitting the first frame of the frame sequence from the transmitting device to the receiving device before transmitting the second frame. Yet another step of the method includes receiving the first frame of the frame sequence from the transmitting device before receiving the second frame. Moreover, the method includes allocating a storage area for the data block, the storage area having a storage capacity that is based on the relative offset of the first frame. A network device which allocates storage for a data packet based upon a relative offset for a last portion of the data block is also disclosed.

20 Claims, 8 Drawing Sheets

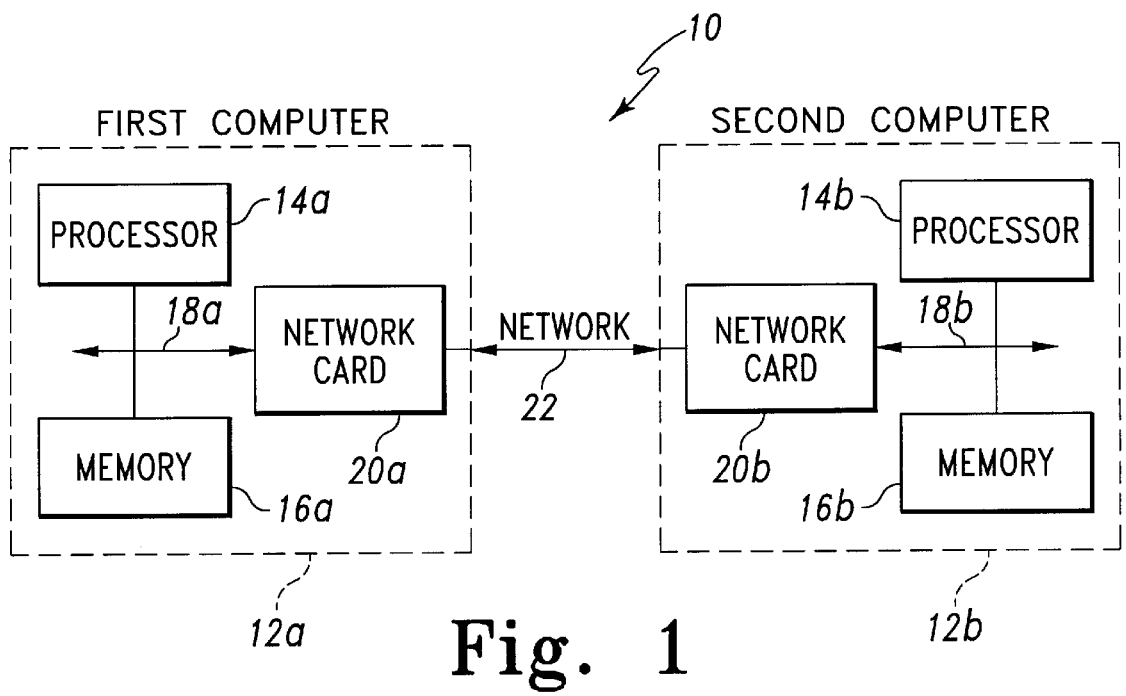
Fig. 1
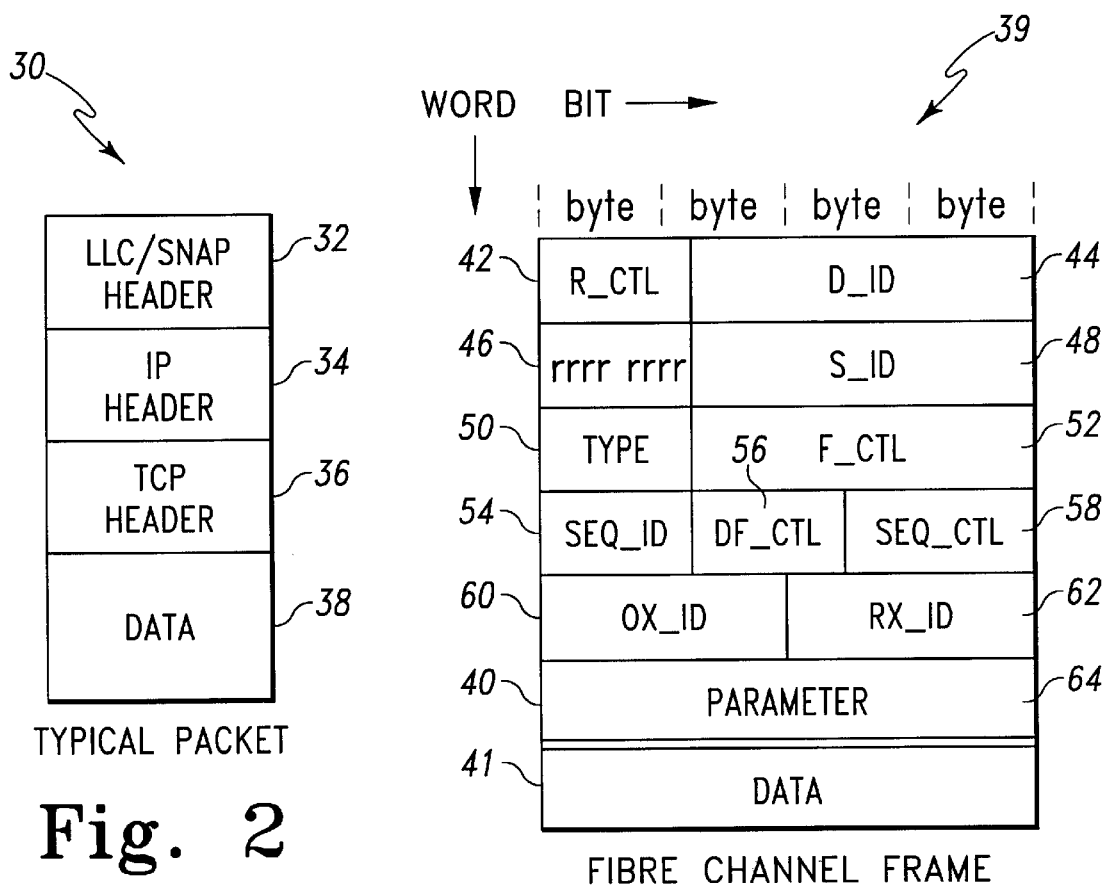
Fig. 2
Fig. 3

DATA TRANSFER METHOD AND APPARATUS THAT ALLOCATE STORAGE BASED UPON A RECEIVED RELATIVE OFFSET

CROSS REFERENCE

Cross reference is made to co-pending U.S. patent application Ser. No. 08/987,181 (Symbios Docket No. 97-096), entitled "Method and Apparatus of Transferring a Packet and Generating an Error Detection Code Therefor," invented by Odenwald, filed on Dec. 8, 1997, and assigned to the same assignee as the present invention.

BACKGROUND OF THE INVENTION

The present invention relates generally to a network communication system, and more particularly to data block transferring method and apparatus which allocate storage for the data block based upon a received relative offset.

Communication between computers is a commonplace occurrence. As computer systems grow faster and more complex, communication between computers grows faster and more complex. As a result, the efficiency of computer communication may become a performance bottleneck and any extra time required in transferring a data packet will be reflected in the overall performance of the computer system.

Because efficient communication is important, improvements in the transmission of a packet are significant. One problem of efficient communication is efficiently generating an error detection code (e.g. a checksum) for a data packet. The problem of efficiently generating an error detection code stems from the typical placement of the error detection code in the header of a data packet and the nature of the error detection code calculation. The error detection code calculation typically requires all bytes of the data packet. As a result, whatever component of the computer system that generates the error detection code must scan all bytes of the data packet in order to generate the error detection code. Once the error detection code is calculated, the error detection code can be placed into the header of the data packet.

As a result of the above error detection code properties, prior art systems which utilized "in order" transmission of the data packet over the network (i.e. transmitting the header of the data packet first) did not calculate the error detection code as the data packet was being transmitted over the network because (1) the header portion included the error detection code, (2) the header portion was transmitted first, and (3) the error detection code was calculated from all bytes of the data packet. As a result, in these prior art systems the a packet including the error detection code was required to be completed prior to transmitting the packet across the network. In general, the prior art systems satisfied this requirement basically in one of two ways.

The first way was to have the processor of the computer system completely construct the packet including the error detection code in the memory of the computer system prior to transmitting the packet. The problem with this solution is that the processor was forced to calculate the error detection code for each packet transmitted over the network which during high speed communication can consume a substantial part of the processor's time.

The second way was to have the network card of the computer system generate the error detection code for the data packet. However, the prior art network cards either (a) had a substantial size buffer for storing the packet prior to transmission or (b) generated a substantial amount of traffic to the memory of the computer system. If the prior art network card had a large enough buffer, the network card would read the packet from memory into its buffer, generate an error detection code for the packet, store the error detection code for the packet in its buffer, and transfer the completed packet including the error detection code from its buffer to the network. The problem with this approach is that the network card was required to have a substantial amount of buffer memory in order to store the entire packet. This substantial amount of buffer memory added substantial costs to the network card.

However, if the prior art network card did not have a substantial size buffer, the network card would read the packet from the memory of the computer system, generate an error detection code for the packet, store the error detection code into the memory of the computer system, and then stream the completed packet including the error detection code from the memory of the computer system to the network. As should be appreciated this approach generated a substantial amount of traffic to the memory of the computer system due to the network card accessing the data packet twice. This substantial traffic to the memory of the computer system effected performance during high speed communications.

Another problem of efficient communication is efficient allocation of resources such a storage. For example, when transferring an IP packet over Fibre Channel, the IP packet is split into a sequence of frames and the sequence of frames is transmitted from a transmitting device such as a computer to a receiving device such as a computer or a printer. In the prior art, the receiving device would allocate a storage area for the IP packet using one of two allocation techniques. The first allocation technique required the receiving device to allocate a storage area having a storage capacity equal to the largest possible IP packet size (e.g. 64 kilobytes). Therefore, when receiving an IP packet smaller than the largest possible IP packet size. the receiving device wasted storage due to allocating too much storage for the IP packet.

The second allocation technique required the receiving device to allocate a storage area each time a frame was received. In particular, for each received Fibre Channel frame, the receiving device allocated a storage area having a storage capacity equal to the portion of the IP packet contained in the Fibre Channel frame. Each time the receiving device allocated a storage area, the receiving device suffered processing overhead associated with the storage allocation. Accordingly, while the second allocation technique enabled the receiving device to better utilize storage, the receiving device suffered more processing overhead due to the multiple memory allocations required for each IP packet.

Therefore, what is needed is a method and apparatus for transferring a packet which allows a receiving device to better allocate storage without incurring substantial processing overhead.

SUMMARY OF THE INVENTION

In accordance with one embodiment of the present invention, there is provided a method of processing a frame sequence used to transmit a data block that includes a first portion and a last portion. One step of the method includes receiving a first frame of the frame sequence, the first frame including the last portion of the data block and a relative offset for the last portion. The relative offset indicates a relative displacement between the first portion of the data block and the last portion of the data block. Another step of the method includes allocating a storage area for the data block such that the storage area has a storage capacity that is based on the relative offset of the first frame.

Pursuant to another embodiment of the present invention, there is provided a method of using a frame sequence to transmit a data block from a transmitting device to a receiving device. One step of the method includes generating a first frame of the frame sequence that includes a last portion of the data block and a relative offset which indicates a relative displacement between a first portion of the data block and the last portion of the data block. Another step of the method includes generating a second frame of the frame sequence that includes the first portion of the data block. The method also includes the step of transmitting the first frame of the frame sequence from the transmitting device to the receiving device before transmitting the second frame. Yet another step of the method includes receiving the first frame of the frame sequence from the transmitting device before receiving the second frame. Moreover, the method includes allocating a storage area for the data block, the storage area having a storage capacity that is based on the relative offset of the first frame.

Pursuant to yet another embodiment of the present invention, there is provided a network device for receiving a data packet transmitted in a frame sequence. The network device includes a network connector, a storage device, and a controller coupled to the network connector and the storage device. The network connector is operable to (i) couple to a network, and (ii) receive the frame sequence from the network. The frame sequence includes a first frame having a last portion of the data packet and a relative offset which indicates a relative displacement between a first portion of the data packet and the last portion of the data packet. The storage device is operable to store the data packet received by the network connector. The controller is operable to (i) receive from the network connector the first frame of the frame sequence including the relative offset, and (ii) allocate a storage area of the storage device for the data packet such that the storage area has a storage capacity that is based upon the relative offset.

It is an object of the present invention to provide an improved method and apparatus for transferring a packet.

It is another object of the present invention to provide a new and useful method and apparatus for transferring a packet.

It is an additional object of the present invention to provide a packet transferring method and apparatus which improves performance of a computer system.

It is a further object of the present invention to provide a method and apparatus which reduces overhead associated with allocating storage for a received packet.

It is yet a further object of the present invention to provide a method and apparatus which enable a receiving device to efficiently allocate storage for a packet without allocating too much storage for the packet.

The above and other objects, features, and advantages of the present invention will become apparent from the following description and the attached drawings.

BRIEF DESCRIPTION OF THE DRAWINGS

FIG. 1 shows a simplified block diagram of an exemplary communications system which incorporates features of the present invention therein;

FIG. 2 shows a simplified diagram of a network communications packet;

FIG. 3 shows a diagram of a Fibre Channel frame that is utilized by the communications system of FIG. 1;

DETAILED DESCRIPTION OF A PREFERRED EMBODIMENT

Figure 4:
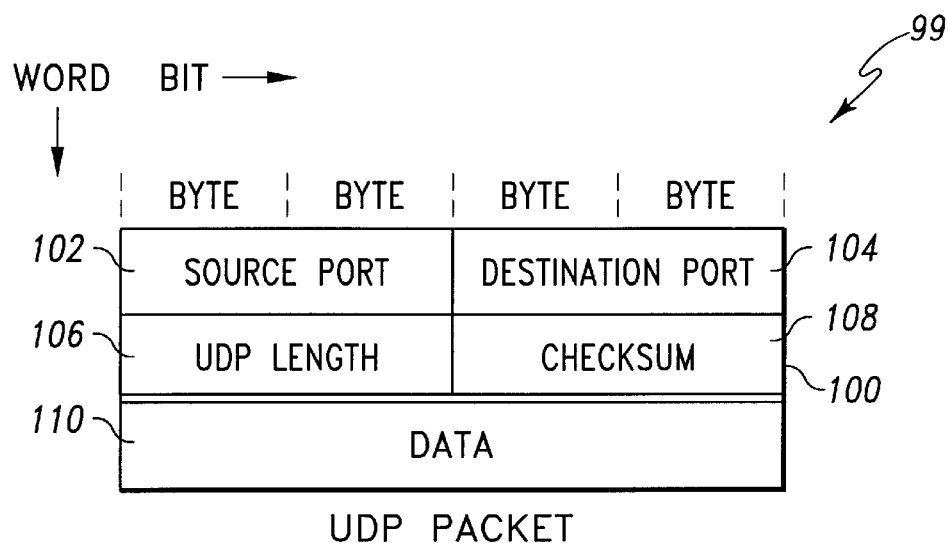
FIG. 4 shows a diagram of a UDP packet that may be transferred by the communications system of FIG. 1.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown a simplified block diagram of a communications system 10. The communications system 10 includes a first computer 12a, a second computer 12b, and a network 22 that links the first computer 12a to the second computer 12b. The first computer 12a includes a first processor 14a, a first memory 16a, a first network card 20a, and a first bus 18a which operably couples the first processor 14a, the first memory 16a, and the first network card 20a together. The second computer 12b likewise includes a second processor 14b, a second memory 16b, a second network card 20b, and a second bus 18b which operably couples the second processor 14b, the second memory 16b, and the second network card 20b together.

The first processor 14a and the second processor 14b are the control units of their respective computer systems 12a and 12b. The first processor 14a and the second processor 14b execute instructions that are stored in their respective memories 16a and 16b and control the transfer of data to their respective memories 16a and 16b.

The first memory 16a and the second memory 16b store data and instructions and are preferably implemented with dynamic random access memories (DRAM) which are capable of storing several Megabytes of data. The first bus 18a and the second bus 18b provide a communication path between the various components of the first computer 12a and the various components of the second computer 12b.

The first network card 20a interfaces the first computer 12a to the network 22, and the second network card 20b interfaces the second computer 12b to the network 22. Finally, the network 22 provides a communication path between the first computer 12a and the second computer 12b and is capable of using a network protocol that enables data to be transferred out of order and later reconstructed in order. A block of data, called a packet, may be transmitted from the first computer 12a over the network 22 to the second computer 12b. Likewise, a packet may be transmitted from the second computer 12b over the network 22 to the first computer 12a. For purposes of clarity, the first computer 12a will be referred to in all further examples as a sending computer 12a, and the second computer 12b will be referred to in all further examples as a receiving computer 12b. It should be appreciated, however, that data transfers may operate in both directions.

Referring now to FIG. 2, there is shown a typical network data transmission packet 30 and its associated network protocol headers. The data packet includes a LLC/SNAP header 32, an Internet Protocol (IP) header 34, a Transmission Control Protocol (TCP) header 36, and a data field 38. A person skilled in the art will recognize that many other protocol combinations can occur, with resultant header combinations. Only one such combination is shown for the purpose of illustrating the multiple layers of protocols/headers that can precede the actual data being transmitted.

The purpose of a header portion is to provide information to adequately enable and control the transmission of the data packet. The information in the header portion can be generally broken down into several categories: 1) routing information, including source and destination information, 2) sequence information for ordering the frames within a data packet, 3) control information, such as header length, data length, and special flags, 4) error detection codes, and 5) optional fields.

Most complex networks operate using several levels of protocol, each operating on a different layer of the network. For example, complex networks operating in accord with the ISO OSI standard architecture include a physical layer, a link layer, a network layer, and a transport layer. Fibre Channel is likewise a multi-layered stack of functional levels. The five levels, FC-0 through FC-4, define: 1) the physical media and transmission rates, 2) the encoding scheme, 3) the framing protocol and flow control, 4) common services, and 5) the upper level application interfaces. Level FC-2, the framing protocol and flow control, has several important functions, such as 1) defining the rules for framing the data, 2) providing the different mechanisms for using Fibre Channel's circuit packet switched service classes, and 3) providing the means for managing the sequence of a data transfer (all frames belonging to a single transfer are uniquely identified by sequential numbering from N through N+M). Level FC-4, the upper level application interface, can accommodate up to 255 protocol types, including IP, IPI-3, FDDI, HIPPI, SCSI-3, SBCCS, Ethernet, Token Ring, and ATM. These individual protocols can operate inside the Fibre Channel transfer, as Fibre Channel provides control only over the physical transfer. Furthermore, Fibre Channel is data independent and simply provides a transport mechanism for sending and receiving data.

The layers of protocol generally require standard header fields to be included with the data sent across a network. These header fields are variously used for such functions as providing destination and source addresses, assuring efficient data flow, and detecting errors in data transmission. Typically, significant processor time is spent in generating the header fields.

Several different network data communication protocols exist. In the present invention, the TCP protocol and the UDP protocol are preferred, but the operation of the invention is not limited to these specific protocols. The present invention can be applied to any network and protocol combination that allows out-of-order delivery of data.

Referring now to FIG. 3, there is shown a Fibre Channel frame 39 that is utilized by the communications system 10 of FIG. 1. The Fibre Channel frame 39 and associated protocol are defined in the *Fibre Channel Physical and Signaling Interface* (FC-PH), ANSI X3.230, Rev 4.3, Jun. 1, 1994, the disclosure of which is hereby incorporated by reference. Furthermore, the Fibre Channel Association's (FCA) *IP Profile*, Rev. 2.3, Apr. 30, 1997, details transferring a IP packet over Fibre Channel, the disclosure of which is hereby incorporated by reference. In particular, the FCA IP Profile indicates that a single Fibre Channel transfer sequence is used to transfer a single IP packet.

The Fibre Channel frame 39 includes a Fibre channel header 40 and a data field 41 for storing data to be transmitted by the Fibre channel frame 39. The Fibre Channel header 40 includes a routing control (R_CTL) field 42, a destination identifier (D_ID) field 44, a reserved field 46, a source identifier (S_ID) field 48, a data structure type (TYPE) field 50, a frame control (F_CTL) field 52, a sequence identifier (SEQ_ID) field 54, a data field control (DF_CTL) field 56, a sequence count (SEQ_CNT) field 58, an originator exchange identifier (OX_ID) field 60, a responder exchange identifier (RX_ID) field 62, and a parameter/data field 64.

The R_CTL field 42 stores one byte field that contains routing bits and information bits to categorize the frame function. The D_ID field 44 stores a three byte destination identifier that identifies the destination computer. The S_ID field 48 stores a three byte source identifier that identifies the source computer. The TYPE field 50 stores a one byte data structure type that identifies the protocol of the Fibre Channel frame 39. The F_CTL field 52 stores a three byte frame control that contains control information relating to the frame content. The SEQ_ID field 54 stores a one byte sequence identifier that is assigned by the sequence initiator (sending computer 12a) which is unique for a specific destination identifier and source identifier pair while the sequence is open.

The DF_CTL field 56 stores a one byte data field control that specifies the presence of optional headers at the beginning of the data field 41 of the Fibre Channel frame 39. The SEQ_CNT field 58 stores a two byte sequence count that indicates the sequential order of data frame transmission within a single sequence or multiple consecutive sequences for the same exchange. The OX_ID field 60 stores a two byte originator exchange identifier that is assigned by the sending computer 12a. The RX_ID field 62 stores a two byte responder exchange identifier that is assigned by the receiving computer 12b and provides a unique, locally meaningful identifier at the receiving computer 12b for an exchange established by the sending computer 12a and identified by an originator exchange identifier.

The parameter/data field 64 has two meanings based on the frame type. For Link-Control frames, the parameter/data field 64 is used to carry information specific to the individual Link_Control frame. For data frames, the parameter/data field 64 specifies a four-byte relative offset that indicates the relative displacement in bytes of the first byte of the payload of the frame from the base address. The use of the parameter/data field 64 for storing a relative offset is optional and is indicated as a login service parameter. The state of the third bit of the F_CTL field 52 determines whether the parameter/data field 64 shall be used as a relative offset for data frames.

The driving force behind the Fibre Channel Standard has been the need for a practical and inexpensive method of high-speed data transfer. In 1988, the American National Standards Institute (ANSI) X3T9.3 committee chartered the Fibre Channel Working Group to develop a practical, inexpensive, yet expandable method of achieving high-speed data transfer among workstations, mainframes, supercomputers, desktop computers, storage devices and display devices. The ensuing Fibre Channel Standard addresses the need for very fast transfers of large volumes of information, while at the same time relieving system manufacturers from the burden of supporting the jumble of channels and networks currently addressing niche requirements.

Fibre Channel operates at a speed of 100 megabytes of data per second in one direction. This is the equivalent of 60,000 pages of text per second. Unlike most networks, Fibre Channel can operate in full duplex mode, sending and receiving data simultaneously. With full duplex capability, the data transfer rate can approach 200 megabytes per second if usage is balanced in both directions. Fibre Channel, therefore, is fast enough to transmit large quantities of data very quickly. Any bottleneck in the formation of the data packet in the sending computer 12a will be reflected in the data transmission rate. Correspondingly, the receiving computer 12b cannot receive the packet any faster than the sending computer 12a can send it, so a bottleneck in the sending computer 12a will automatically limit the efficiency of the receiving computer 12b. Therefore, any streamlining of the transmit process will aid the communication speed.

Similarly, any bottleneck in the receiving the data packet in the receiving computer 12b may limit the performance of the sending computer 12a. Since (i) the receiving computer 12b must allocate storage to store the received data packet, and (ii) allocation of storage consumes processing time, any streamlining of the storage allocation process will aid the communication speed.

An important feature of Fibre Channel is the sequencing control given by the data contained in the Fibre Channel header 40. In particular, the Fibre protocol enables the sending computer 12a to transmit data out of order while enabling the receiving computer 12b to reconstruct the data in order. As discussed in more detail below, the network cards 20a and 20b of FIG. 6 and the transfer method 300 of FIG. 8 utilize this out of order transmitting capability of the Fibre Channel protocol to increase the performance of the sending computer 12a and the receiving computer 12b.

Referring now to FIG. 4, there is shown a UDP packet 99 which may be transferred by the communication system 10 of FIG. 1. The UDP packet 99 and the UDP protocol are defined in Request for Comment (RFC) 768 [Postel 1980], the disclosure of which is hereby incorporated by reference. All internet standards are published as RFC's and may be obtained freely by sending an e-mail message to rfc-info@ISI.edu. The UDP packet 99 includes a UDP header 100 and an optional UDP data field 110 for storing data to be transferred. The UDP header 100 includes a source port number field 102, a destination port number field 104, an UDP length field 106, and a UDP checksum field 108.

The source port number field 102 stores a source port number that identifies the sending computer, while the destination port number field 104 stores a destination port number that identifies the receiving computer. The UDP length field 106 stores a UDP length that indicates the length of the UDP header 100 and the UDP data field 110 in bytes. The UDP checksum 108 stores a 16-bit checksum that covers the UDP header 100 and the UDP data field 106. The UDP checksum 108 is optional and does not have to be included by the sending computer 12a.

Figure 5:
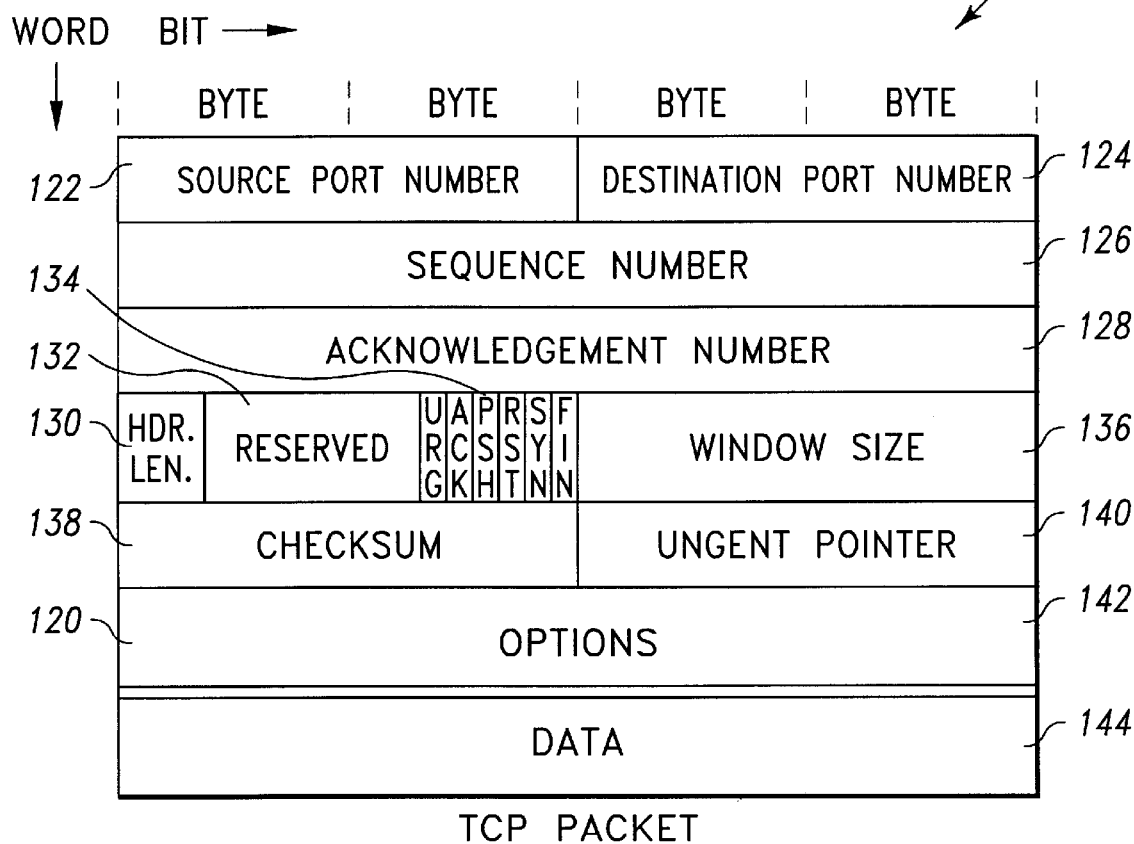
FIG. 5 shows a diagram of a TCP packet that may be transferred by the communications system of FIG. 1.

Referring now to FIG. 5, there is shown a TCP packet 119 which may be transferred by the communications system 10 of FIG. 1. The TCP packet 119 and associated TCP protocol are defined in RFC 793 [Postel 1981c] and discussed in detail in *TCP/IP Illustrated,* Volume 1, W. Richard Stevens, Addison-Wesley Publishing Co. (1994), the disclosures of which are both hereby incorporated by reference. The TCP packet 119 includes a TCP header 120 and an optional data filed 144 for storing data to be transferred. The TCP header 120 includes a source port number field 122, a destination port number field 124, a sequence number field 126, an acknowledgment number field 128, a header length field 130, a 6-bit reserved area 132, control flags 134, a window size field 136, a TCP checksum 138, an urgent pointer field 140, and an options field 142.

The source port number field 122 stores a source port number that identifies the sending computer, while the destination port number field 124 stores a destination port number that identifies the receiving computer. The sequence number field 126 stores a sequence number that identifies the byte in the stream of data from the sending computer 12a to the receiving computer 12b that the first byte of data in this packet represents. The acknowledgment number field 128 stores an acknowledgment number that indicates the next sequence number that the sender of the acknowledgment expects to receive. The header length field 130 stores a head length that indicates the length of the header portion in 32-bit words.

The six control flags 134 are: (1) URG, the urgent pointer is valid, (2) ACK, the acknowledgment number is valid, (3) PSH, the receiver should pass this data to the application as soon as possible, (4) RST, reset the connection, (5) SYN, synchronize sequence numbers to initiate a connection, and (6) FIN, the sender is finished sending data. The window size field 136 stores a window size that indicates the number of bytes, starting with the one specified by the acknowledgment number field, that the receiving computer is willing to accept.

The TCP checksum field 138 stores a 16-bit checksum that covers both the TCP header 100 and the TCP data field 144. The TCP checksum field 138 is a mandatory field that must be generated and stored by the sender, and then verified by the receiver. The urgent pointer field 140 stores a positive offset that is added to the sequence number field of the segment to yield the sequence number of the last byte of urgent data. The urgent mode of the TCP protocol and the urgent pointer field 140 provide the sender with a mechanism for transmitting emergency data. The options field 142 contains several options including a maximum segment size that specifies the maximum size of a segment that the sending computer is willing to receive.

As can be seen from FIG. 4 and FIG. 5, both the UDP packet 99 and the TCP packet 119 utilize a 16-bit checksum for error detection. The only difference between the two checksums is the physical location of the checksum within their respective headers 100 and 120. In the UDP header 100 the checksum occupies bytes seven and eight, while in the TCP header 120 the checksum occupies bytes seventeen and eighteen.

Figure 6:
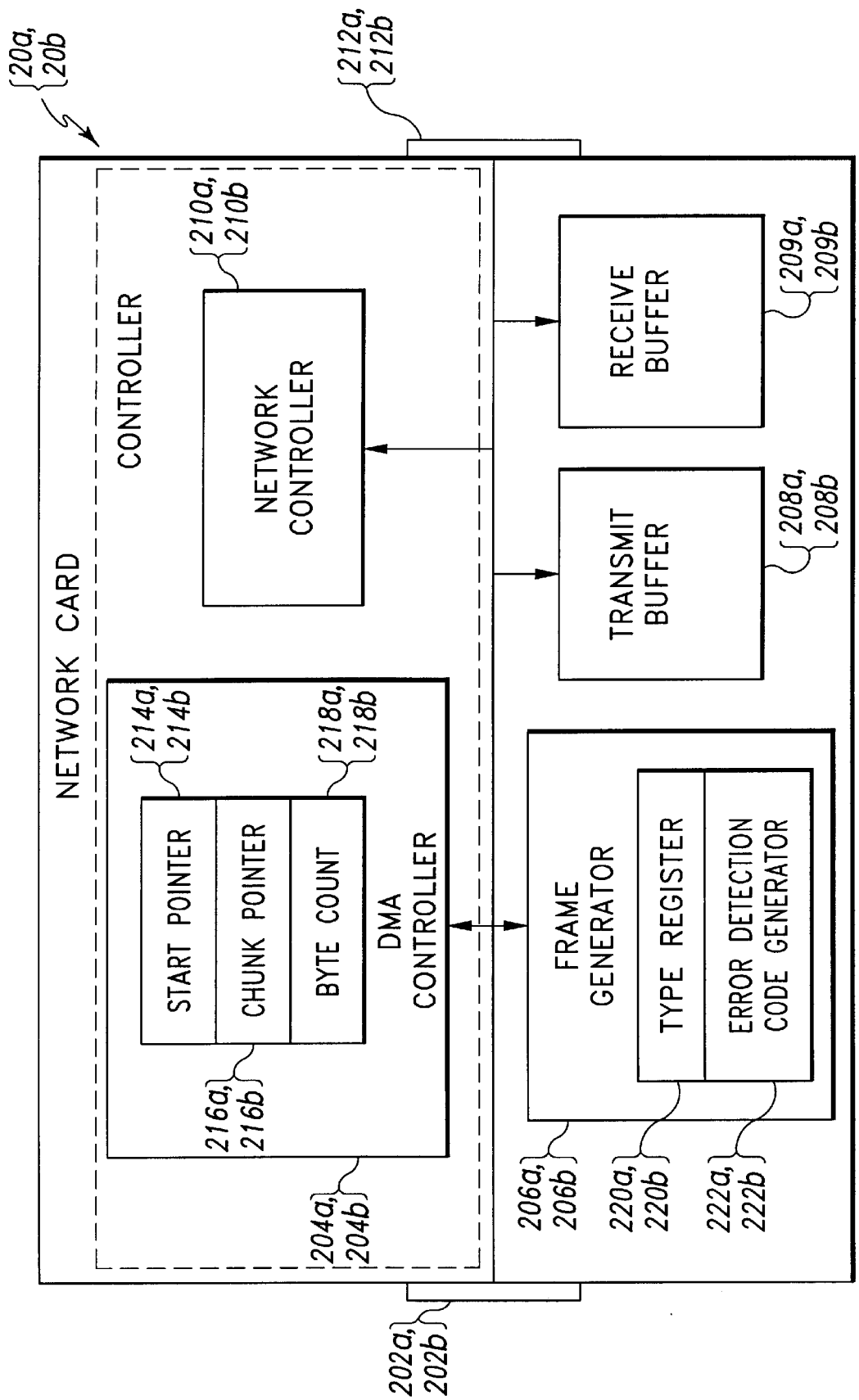
FIG. 6 shows a simplified block diagram of the network cards of FIG. 1.

Referring now to FIG. 6, there is shown a simplified block diagram of the first network card 20a and the second network card 20b of FIG. 1. The first network card 20a includes a first host connector 202a, a first frame generator 206a, a first transmit buffer 208a, a first receive buffer 209a, a first network connector 212a, and a controller 213a which includes a first direct memory access (DMA) controller 204a and a first network controller 210a. The first DMA controller 204a, the first frame generator 206a, the first transmit buffer 208a, the first receive buffer 209a, and the first network controller 210a are each coupled to the first host connector 202a and to the first network connector 212a. The first host connector 202a operably couples the first network card 20a to (1) the first processor 14a and (2) the first memory 16a, and the first network connector 212a operably couples the first network card 20a to the network 22.

Likewise, the second network card 20a includes a second host connector 202b, a second DMA controller 204b, a second frame generator 206b, a second transmit buffer 208b, a second receive buffer 209b, a second network controller 210b, and a second network connector 212b. The second DMA controller 204b, the second frame generator 206b, the second transmit buffer 208b, the second receive buffer 209b, and the second network controller 210b are each coupled to the second host connector 202b and to the second network connector 212b.

The second host connector 202b operably couples the second network card 20b to (1) the second processor 14b and (2) the second memory 16b, and the second network connector 212b operably couples the second network card 20b to the network 22. Since the components of the first network card 20a and the components of the second network card 20b operate in a similar manner, only the components of the first network card 20a will be described in further detail.

The first DMA controller 204a initiates and regulates the transfer of data from the first memory 16a to the first transmit buffer 208a. The first DMA controller 204a also initiates and regulates the transfer of data from the first receive buffer 209a to the first memory 16a. The first DMA controller 204a includes a first start pointer register 214a, a first chunk pointer register 216a, and a first byte count register 218a. The first start pointer register 214a stores a first start pointer, the first chunk pointer 216a register stores a first chunk pointer, and the first byte count register 218a stores a first byte count. A pointer is merely an address used by the first DMA controller 204a to track data locations of the first memory 16a.

The first start pointer register 214a receives from the first processor 14a a base address (a) for a packet that is to be transmitted to the network 22 or (b) for a packet that is to be received from the network 22. The first chunk pointer register 216a stores an address that points to a location in the first memory 16a (a) from which a chunk of data is to be transferred to the first transmit buffer 208a or (b) to which a chunk of data is to be transferred from the first receive buffer 209a. The first byte count register 218a receives from the first processor 14a (a) a value indicating the number of bytes that are in the packet to be transmitted or (b) a value indicating a maximum length for the packet to be received.

In the preferred embodiment, the first DMA controller 204a uses the first start pointer register 214a and the first byte count register 218a to mark the boundaries of the data packet to be transferred and uses the first chunk pointer register 216a to download chunks of the data packet from the first memory 16a. However, the first DMA controller 204a could also be implemented to utilize a scatter-gather list that would enable the first DMA controller 204a to transfer (a) a data packet that had been stored in the first memory 16a in a non-contiguous manner to the first transmit buffer 208a, and (b) chunks of a data packet from the first receive buffer 209a to the first memory 16a in a non-contiguous manner.

The first frame generator 206a includes a first type register 220a and a first error detection code generator 222a.

The first frame generator 206a assembles the incoming data chunk into a transmission-ready frame. In particular, the first frame generator 206a appends a first Fibre Channel header 40 to the chunk of data stored in the first transmit buffer 208a. Furthermore, with the aid of the first type register 220a and the first error detection code generator 222a, the first frame generator 206a generates an error detection code for the packet being transmitted and places the generated error detection code into the packet header (e.g. the UDP header 100, or the TCP header 120).

The first type register 220a of the first frame generator 206a receives and stores a packet type from the first processor 14a that indicates the type of packet that the first network card 20a will be sending. The first frame generator 206a uses the packet type to ensure that the generated error detection code is properly placed into the packet header. Furthermore, the first error detection code generator 222a uses the packet type in order to generate a proper error detection code for the type of packet.

When the first network card 20a transmits data, the first error detection code generator 222a monitors all data being transferred from the first memory 16a to the first transmit buffer 208a. The first error detection code generator 222a creates a unique error detection code based on the data being transferred. It should be appreciated that many types of error detection codes, such as a checksum, a cyclic redundancy check (CRC), or others may be used by various types of packets and that the present invention is not limited to only one type of error detection code. In a preferred embodiment of the present invention, however, the error detection code is a 16-bit checksum which is generally a summation of the bytes of the packet to be transmitted. A detail description of the appropriate checksum calculation for the UDP packet 99 and the TCP packet 119 may be found in *TCP/IP Illustrated, Volume 1*, W. Richard Stevens, Addison-Wesley Publishing Co. (1994).

The checksum, which is inserted into either the UDP checksum field 108 of FIG. 4 or the TCP checksum field 138 of FIG. 5, is generated by the first error detection code generator 222a of the first network card 20a as the data is being transferred from the first memory 16a to the network 22. The advantage of the first error detection code generator 222a of the first network card 20a generating the checksum is that the first processor 14a spends less time partaking in the transmission of the data packet due to the first processor 14a not generating the checksum.

Furthermore, when the first network card 20a receives data, the first error detection code generator 222a monitors all data being transferred from the first receive buffer 209a to the first memory 16a. The first error detection code generator 222a creates an error detection code based on the data received from the network 22 and transferred to the first memory 16a. In a preferred embodiment of the present invention, the first error detection code generator 222a generates the same type of error detection code when receiving data as when transmitting data. Therefore, the first network card 20a may detect an error in a packet received from the network 22 if the error detection code generated by the first error detection code generator 222a does not match the error detection code received from the network 22.

The first transmit buffer 208a receives and holds the data to be transmitted. The first DMA controller 204a and the first frame generator 206a use the first transmit buffer 208a for assembling frames that are appropriate for transferring across the network 22. In the preferred embodiment, the first transmit buffer 208a is implemented with enough dynamic random access memory (DRAM) to store at least one Fibre Channel frame. Since the first transmit buffer 208a need only be large enough to store a single Fibre Channel frame, the first transmit buffer 208a of the first network card 20a may be implemented less expensively than prior art network cards that required the network card to store an entire packet which may include several frames.

The first receive buffer 209a receives and holds the data received from the network 22. The first DMA controller 204a utilizes information stored in the frame header of a received frame to cause the data of the frame to be stored in an appropriate location in the first memory 16a. In the preferred embodiment, the first receive buffer 209a is implemented with enough dynamic random access memory (DRAM) to store at least one Fibre Channel frame. Since the first receive buffer 209a need only be large enough to store a single Fibre Channel frame, the first receive buffer 209a of the first network card 20a may be implemented less expensively than prior art network cards that required the network card to store an entire packet which may include several frames.

The first network controller 210a controls the transfer of information between the first network card 20a and the network 22. The first network controller 210a in general initiates a network connection and performs network control functions. When a frame in the first transmit buffer 208a is completely constructed, the first network controller 210a transfers the frame from the first transmit buffer 208a to the network 22 and signals the first DMA controller 204a that it may begin assembling the next frame. Furthermore, the first network controller 210a controls the transfer of information from the network 22 to the first receive buffer 209a.

It should be appreciated that in the preferred embodiment, the first DMA controller 204a includes multiple sets of the registers 214, 216, and 218 so that the first DMA controller 204a may handle multiple, open Fibre Channel transfer sequences. Likewise, the first frame generator 206a includes multiple first type registers 220a and storage areas for intermediate error detection codes so that the first frame generator 206a may handle multiple, open Fibre Channel transfer sequences.

Figure 7:
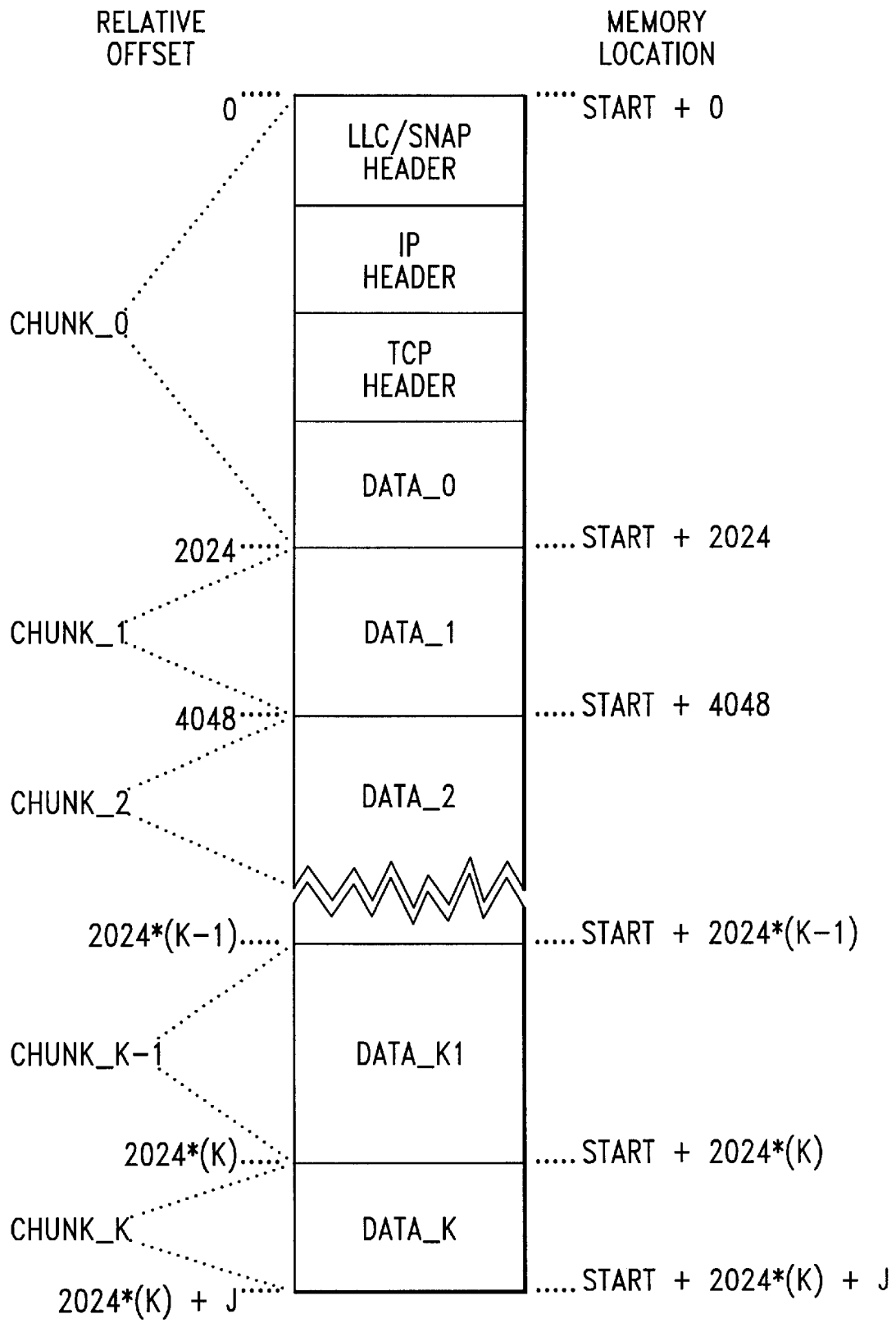
FIG. 7 shows a graphical representation of how a transfer method splits a TCP packet into smaller portions.
Figure 8:
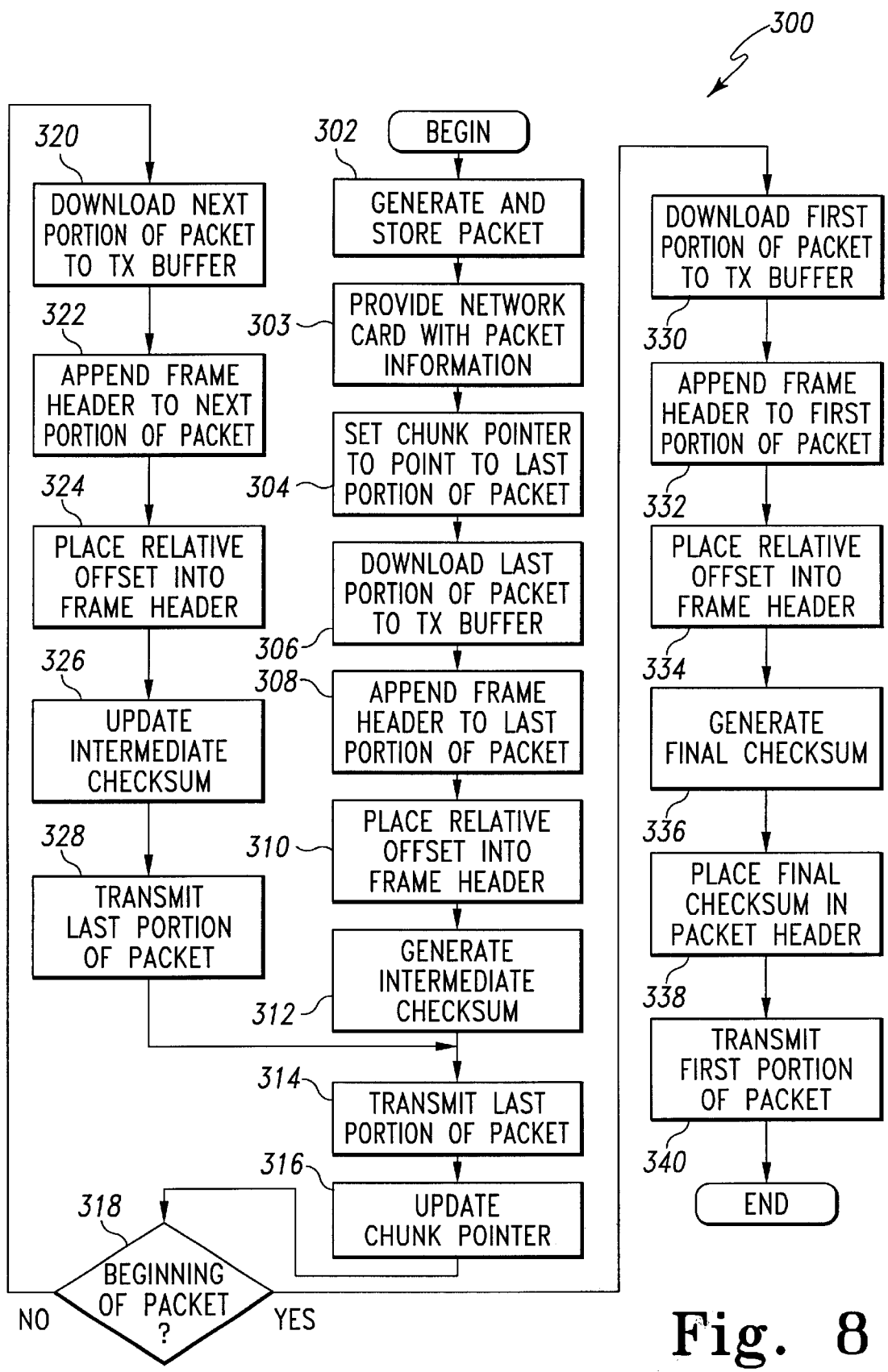
FIG. 8 shows a flowchart of a transfer method utilized by the communications system of FIG. 1.

Shown in FIG. 7 is a graphical representation of how the transfer method 300 of FIG. 8 splits into smaller portions a TCP packet stored in the first memory 16a at a memory location START. As depicted, the TCP packet is spit into portions CHUNK_0 . . . CHUNK_K. The portions CHUNK_0 . . . CHUNK_K-1 are equal in length to a fixed payload size P_SIZE (e.g. 2024 bytes). Furthermore, the last portion CHUNK_K has a length of J bytes which in the preferred embodiment is less than or equal to the fixed payload size P_SIZE.

The first portion CHUNK_0 of the TCP packet includes a LLC/SNAP header 32, an IP header 34, a TCP header 36, and a first data portion DATA_0. Moreover, the first portion CHUNK_0 also has a relative offset of 0 which indicates the relative displacement between the beginning of the TCP packet and the beginning of the first portion CHUNK_0. The other portions CHUNK_1 . . . CHUNK_K of the TCP packet include data portions DATA_1 . . . DATA_K, respectively. Furthermore, each of the portions CHUNK_1 . . . CHUNK_K have a relative offset which indicates the relative displacement between the beginning of the TCP packet and the beginning of the respective portion CHUNK_1 . . . CHUNK_K of the TCP packet.

Referring now to FIG. 8, there is shown a flowchart of a transfer method 300 that is utilized by the communications system 10 of FIG. 1. The following description, assumes that an IP packet such as a TCP packet is being transmitted over a Fibre Channel network. However, it should be appreciated that the present invention is not limited to these protocols. In step 302, a TCP packet is generated and stored in the first memory 16a of the sending computer 12a. In generating the TCP packet, the first processor 14a leaves the TCP checksum field 138 empty. Furthermore, for ease of discussion, the first processor 14a stores the generated TCP packet in a contiguous block of the first memory 16a. (See FIG. 7.)

In order to prepare the first network card 20a to transfer the TCP packet, the first processor 14a in step 303 provides the first network card 20a with various information about the TCP packet stored in the first memory 16a. In particular, the first processor 14a provides the first network card 20a with (a) a first start pointer S_PTR1 (e.g. memory location START of FIG. 7) that points to the first byte of the TCP packet, (b) a first byte count B_COUNT1 that indicates the length of the TCP packet, and (c) a first packet type P_TYPE that indicates the packet to be transferred is a TCP packet.

Once the first processor 14a of the sending computer 12a has set up the packet for transmission, the first processor 14a signals the first network card 20a that the TCP packet is ready to be transmitted. From this point on the first network card 20a takes over and conducts the transmission of the TCP packet. In step 304, the first DMA controller 204a of the first network card 20a sets the first chunk pointer register 216a such that the first chunk pointer register 216a contains a first chunk pointer C_PTRI that points to the last portion CHUNK_K of the TCP packet. (See FIG. 7.)

In the preferred embodiment, all frames used to transmit the TCP packet have a fixed payload size P_SIZE (e.g. 2024 bytes) except for the frame used to transmit the last portion CHUNK_K of the TCP packet. Accordingly, the first DMA controller 204a may set the first chunk pointer register 216a by (i) dividing the first byte count B_COUNT1 by the fixed payload size P_SIZE to obtain a remainder R, and (ii) subtracting the remainder R from the first byte count B_COUNT1 to obtain a relative offset R_OFFSET between the first portion CHUNK_0 of the TCP packet and the last portion CHUNK_K of the TCP packet. After obtaining the relative offset R_OFFSET for the last portion CHUNK_K the, first DMA controller 204a (i) adds the relative offset R_OFFSET to the first start pointer S_PTR1 to obtain the first chunk pointer C_PTR1, and (ii) stores the first chunk pointer C_PTR1 in the first chunk pointer register 216a.

Then, in step 306, the first DMA controller 204a downloads a portion of the TCP packet. In particular, the first DMA controller 204a transfers the portion of the TCP packet pointed to by the first chunk pointer C_PTR1 from the first memory 16a to the first transmit buffer 208a. In step 308, the first frame generator 206a appends a Fibre Channel header to the portion of the TCP packet stored in the first transmit buffer 208a. It should be appreciated that the first frame generator 206a could be implemented to append other kinds of headers in order to utilize the present invention in other networking environments.

Next, in step 310 the first frame generator 206a places the relative offset R_OFFSET into the parameter/data field 64 of the Fibre Channel header. The receiving computer 12b uses the relative offset R_OFFSET stored in the parameter/data field 64 to reconstruct the portions CHUNK_0 . . . CHUNK_K of the TCP packet into the proper order.

The first error detection code generator 222a in step 312 generates an intermediate checksum for the TCP packet 119.

To this end, the first error detection code generator 222a sums each byte of the last portion CHUNK_K as the last portion CHUNK_K is downloaded into the first transmit buffer 208a. Moreover, the first error detection code generator 222a stores the resulting intermediate checksum for the TCP packet for later processing.

After step 312, a completed frame resides in the first transmit buffer 208a. Therefore, in step 314, the first network controller 210a transfers the completed frame from the first transmit buffer 208a to the network 22 thereby completing the transfer of last portion CHUNK_K of the TCP packet stored in the first memory 16b.

In step 316, the first chunk pointer C_PTR1 stored in the first chunk pointer register 216a is decremented by the payload size P_SIZE (e.g. 2024) of the next portion of the TCP packet (e.g. chunk CHUNK_K-1 of FIG. 7) to be transferred. Due to decrementing the first chunk pointer register 216a by the payload size P_SIZE, the first chunk pointer 216a contains a first chunk pointer C_PTR1 which points to the beginning of the next portion of the TCP packet (e.g. CHUNK_K-1) to be transferred.

In step 318, the first DMA controller 222a determines from the updated first chunk pointer C_PTR1 and the start pointer S_PTR1 whether the beginning of the TCP packet has been reached. If the beginning of the TCP packet has not been reached, then the first network card 20a proceeds to step 320 of the transfer method 300 in order to process another portion of the TCP packet. If the beginning of the TCP packet has been reached, then the first network card 20a proceeds to step 330 in order to process the first portion CHUNK_0 of the TCP packet.

In step 320, the first DMA controller 204a downloads the next portion of the TCP packet. In particular, the first DMA controller 204a transfers the portion of the TCP packet pointed to by the first chunk pointer C_PTR1 from the first memory 16a to the first transmit buffer 208a. In step 322, the first frame generator 206a appends a Fibre Channel header to the portion of the TCP packet stored in the first transmit buffer 208a.

Then, in step 324 the first frame generator 206a generates and places the relative offset R_OFFSET for the next portion of the TCP packet into the parameter/data field 64 of the Fibre Channel header. To this end, the first frame generator 206a subtracts the first start pointer S_PTR1 from the first chunk pointer C_PTR1 to obtain the relative offset R_OFFSET. The receiving computer 12b uses the relative offset R_OFFSET stored in the parameter/data field 64 to reconstruct the portions CHUNK_0 . . . CHUNK_K of the TCP packet into the proper order.

The first error detection code generator 222a in step 326 updates the stored intermediate checksum for the TCP packet. To this end, the first error detection code generator 222a (i) sums each byte of the next portion of the TCP packet as the next portion is downloaded into the first transmit buffer 208a, and (ii) adds the total to the previously stored intermediate checksum. Until the first portion CHUNK_0 of the TCP packet is processed, the resulting intermediate checksum for the TCP packet is stored in the first error detection code generator 222a.

After step 326, a completed frame resides in the first transmit buffer 208a. Therefore, in step 328, the first network controller 210a transfers the completed frame from the first transmit buffer 208a to the network 22 thereby completing the transfer of next portion of the TCP packet stored in the first memory 16b. After transmitting the next portion of the TCP packet, the first network card returns to step 314 in order to (i) update the first chunk pointer register 216a, and (ii) process another portion of the TCP packet.

Once the first chunk pointer C_PTR1 reaches the beginning of the TCP packet, the first chunk pointer register 216a contains a first chunk pointer C_PTR1 that is equal to the first start pointer S_PTR1. As a result, the chunk pointer now points to the first portion CHUNK_0 of the TCP packet. Accordingly, the first DMA controller 204a in step 330 downloads the first portion CHUNK_0 of the TCP packet. In particular, the first DMA controller 204a transfers the first portion CHUNK_0 of the TCP packet pointed to by the first chunk pointer C_PTR1 from the first memory 16a to the first transmit buffer 208a.

Then, in step 332, the first frame generator 206a appends a Fibre Channel header to the first portion CHUNK_0 stored in the first transmit buffer 208a. Next, in step 334 the first frame generator 206a generates and places a relative offset R_OFFSET into the parameter/data field 64 of the Fibre Channel header appended to the first portion CHUNK_0.

Then, in step 336, the first error detection code generator 222a generates the final checksum for the TCP packet. To this end, the first error detection code generator 222a (1) sums each byte of the TCP header and TCP data contained in the first portion CHUNK_0 together as the first portion CHUNK_0 is downloaded into the first transmit buffer 208a, and (2) adds the total to the stored intermediate checksum for the TCP packet. Furthermore, in step 338, the final checksum is placed into the checksum field of the TCP header.

After step 338, the first transmit buffer 208a contains a completed frame that includes the TCP header with the final checksum stored within the checksum field. The first network controller 210a then in step 340 transfers the completed frame from the first transmit buffer 208a to the network 22, thus completing the transfer of the TCP packet.

Figure 9:
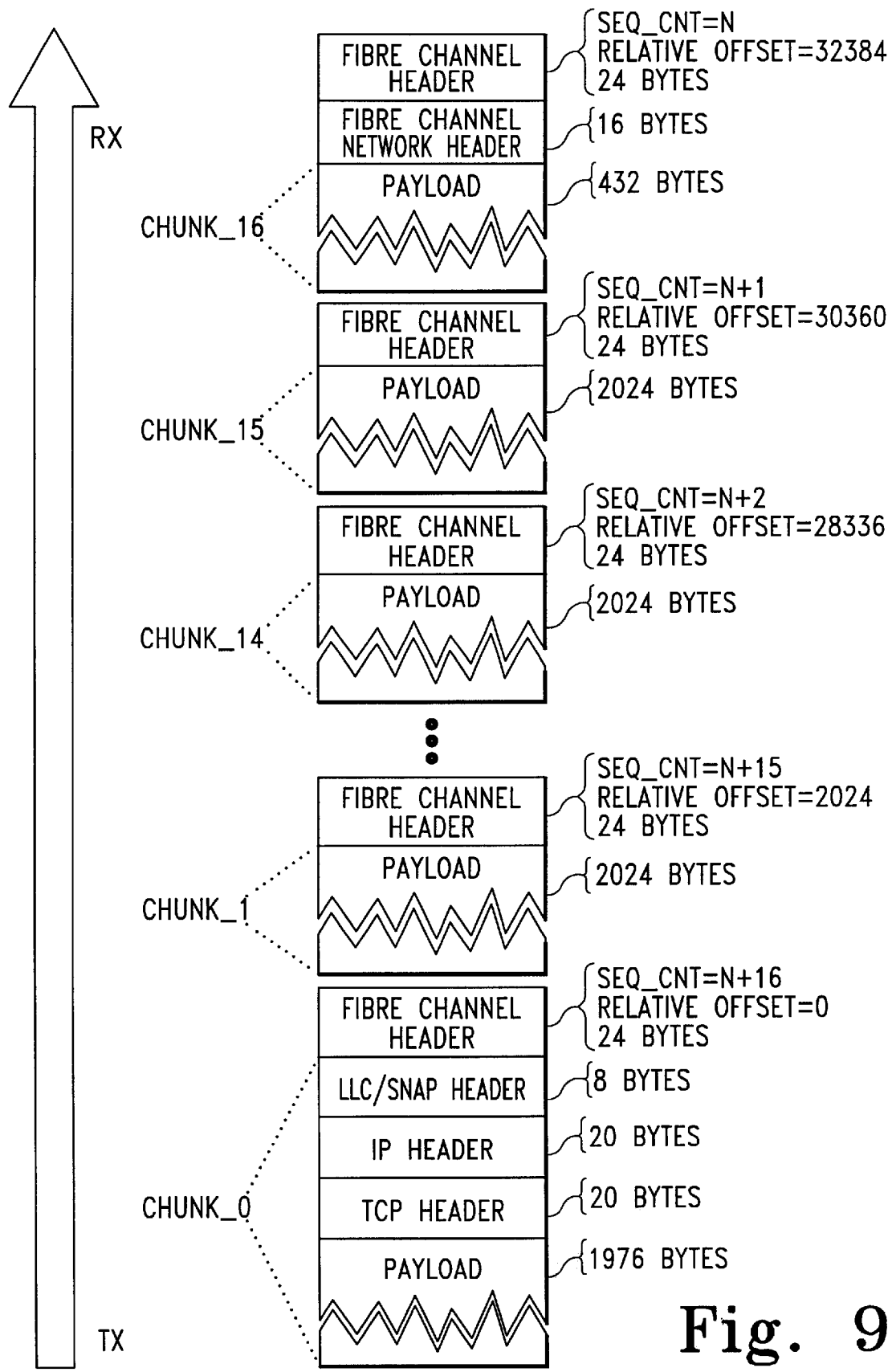
FIG. 9 shows a graphical representation of the transfer method of FIG. 8.

Shown in FIG. 9 is a graphical representation of the transfer method 300 of FIG. 8 transmitting a TCP/IP packet having a length of 32,816 bytes. In particular, the graphical representation shows that due to the Fibre Channel protocol as each frame is transmitted it contains a sequential count in the SEQ_CNT field 58 that is one greater than the sequential count of the previously transmitted frame. Furthermore, the graphical representation shows that the first frame transmitted includes a relative offset equal to 32,384 and a payload of 432 bytes. The summation of the relative offset and the payload of the first frame equals 32,816 bytes which is also equal to the length of the TCP/IP packet. As a result, a receiving device such as a printer or receiving computer 12b may determine the length of the TCP/IP packet after reception of the first frame and allocate storage having a capacity equal to the length of the TCP/IP packet.

Figure 10:
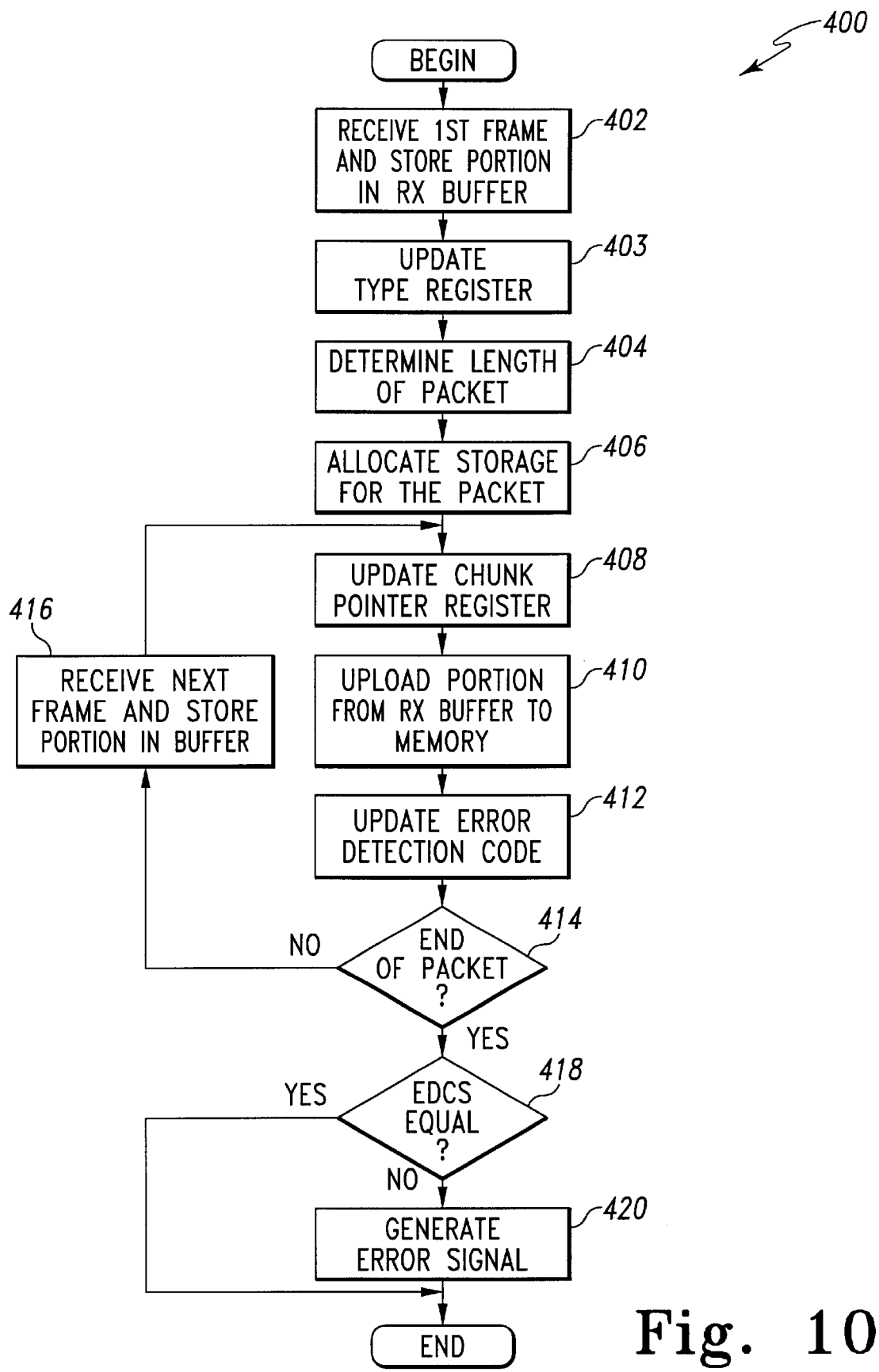
FIG. 10 shows a flowchart of a receive method utilized by the communications system of FIG. 1.

Referring now to FIG. 10, there is shown a flowchart of a preferred receiving method 400 for receiving the TCP packet that has been transmitted via the transfer method 300. In step 402, the second network card 20b of the receiving computer 12b receives the first frame of the frame sequence (i.e. the frame with SEQ_CNT=N in FIG. 7) from the network 22. In response to receiving the first frame, the second network controller 210b strips the Fibre Channel frame header from the first frame and causes the last portion CHUNK_K of the TCP packet to be stored in the second receive buffer 209b. Furthermore, the second network controller 210b in step 403 determines from the TYPE field of the Fibre channel frame header the type of packet being transferred and updates the second type register 220b accordingly.

The second DMA controller 204b in step 404 determines the length of the TCP packet based upon the relative offset R_OFFSET stored in the parameter/data field 64 of the Fibre Channel header of the first frame. Since the relative offset R_OFFSET of the first frame indicates the byte displacement between the beginning of the first portion CHUNK_0 and the beginning of the last portion CHUNK_K, the relative offset R_OFFSET indicates the length (number of bytes) of the TCP packet except for the length (number of bytes) of the last portion CHUNK_K of the TCP packet. Accordingly, the second DMA controller 204b may determine the length of the TCP packet by (i) determining the number of bytes contained in the last portion CHUNK_K, and (ii) adding the number of bytes of the last portion CHUNK_K to the relative offset R_OFFSET to obtain the length of the entire TCP packet.

After determining the length of the TCP packet, the second network card 20b in step 406 allocates a storage area of the second memory 16b for the TCP packet. To this end, the second network card 20b allocates (i) a storage area at least as large as the determined length of the TCP packet, and (ii) stores in the second start pointer register 214b a second start pointer S_PTR2 which points to the allocated storage area. In the preferred embodiment, the second controller 20b allocates the memory 16b in page increments (e.g. 2024 bytes) and allocates a storage area having the exact number (i.e. minimum number) of pages required to store the TCP packet.

The above allocation schemed of the second network card 20b is advantageous over prior art allocation schemes. As stated previously, prior art allocation schemes either (i) allocated storage as each frame of a sequence arrived, or (ii) allocated storage sufficient in capacity to store the largest possible TCP packet (i.e. 64 kilobytes). The storage allocation scheme of the second network card 20b due to allocating storage for the entire TCP packet upon receiving the first frame of the transfer sequence eliminates the excessive processing overhead associated with allocating storage as each frame of the sequence is received. Moreover, the storage allocation scheme of the second network card 20b due to determining the length of the entire TCP packet upon receiving the first frame of the transfer sequence is able to more efficiently allocate storage for the TCP packet by allocating a storage area having a capacity just large enough to store the TCP packet.

The second network controller 210b in step 408 causes the second DMA controller 222b to update the second chunk pointer C_PTR2 so that the portion of the TCP packet stored in the second receive buffer 209b may be stored in a proper location in the second memory 16b. In particular, the second network controller 210b causes the second DMA controller 222b to (1) add the relative offset R_OFFSET stored in the parameter/data field 64 of the Fibre Channel frame header to the second start pointer S_PTR2 stored in the second start pointer register 214b, and (2) store the resulting second chunk pointer C_PTR2 in the second chunk pointer register 216b.

The second DMA controller 204b then in step 410 transfers the portion of the TCP packet stored in the receive buffer 209b to the location in the second memory 20b pointed to by the second chunk pointer C_PTR2. In response to transferring the portion of the TCP packet from the second receive buffer 209b to the second memory 20b, the second error detection code generator 222b in step 412 updates an intermediate error detection code for the TCP packet. In particular, since the contents of the second type register 220b indicate that a checksum should be calculated for the TCP packet, the second error detection code generator 222b sums each byte of the portion stored in the receive buffer 209b as the portion is transferred to the second memory 16b, and adds the total to any previous intermediate error detection code for the TCP packet. The second error detection code generator 222b then stores the resulting error detection code for the TCP packet.

The second network controller 210b in step 414 determines whether the transmission of the TCP packet has ended. In particular, the second network controller 210b determines from information of the received frame whether the frame is either (a) a first frame of a sequence, (b) a frame of an opened sequence, or (c) a last frame of an opened sequence. In the preferred embodiment, the communications system 10 transfers in accord with the FCA IP Profile one packet per a Fibre Channel transfer sequence. As a result, when the second network controller 210b determines that all frames of the sequence have been received, then the second network controller 210b has determined the end of a TCP packet transfer.

If the second network controller 210b determines that the transmission of the TCP packet has ended, then the second network card 20b proceeds to step 420 in order to determine whether an error occurred during the transmission of the TCP packet. If, however, the second network controller 210b determines that the transmission of the TCP packet has not ended, then the second network card 20b proceeds to step 416 in order to process another frame.

In step 416, the second network card 20b of the receiving computer 12b receives the next frame of the frame sequence (e.g. the frame with SEQ_CNT=N+1 in FIG. 7) from the network 22. In response to receiving the next frame, the second network controller 210b strips the Fibre Channel frame header from the next frame and causes the next portion of the TCP packet to be stored in the second receive buffer 209b. The second network card 20b then returns to step 408 in order to finish processing the next portion of the TCP packet.

After determining in step 414 that the end of the TCP packet has been reached, the second network controller 210b in step 418 compares the error detection code received from the network 22 with the error detection code stored in the second error detection code generator 222b. If the two error detection codes do not match, then the second network controller 210b in step 420 informs the second processor 14b that an error occurred during transmission of the TCP packet.

Figure 11:
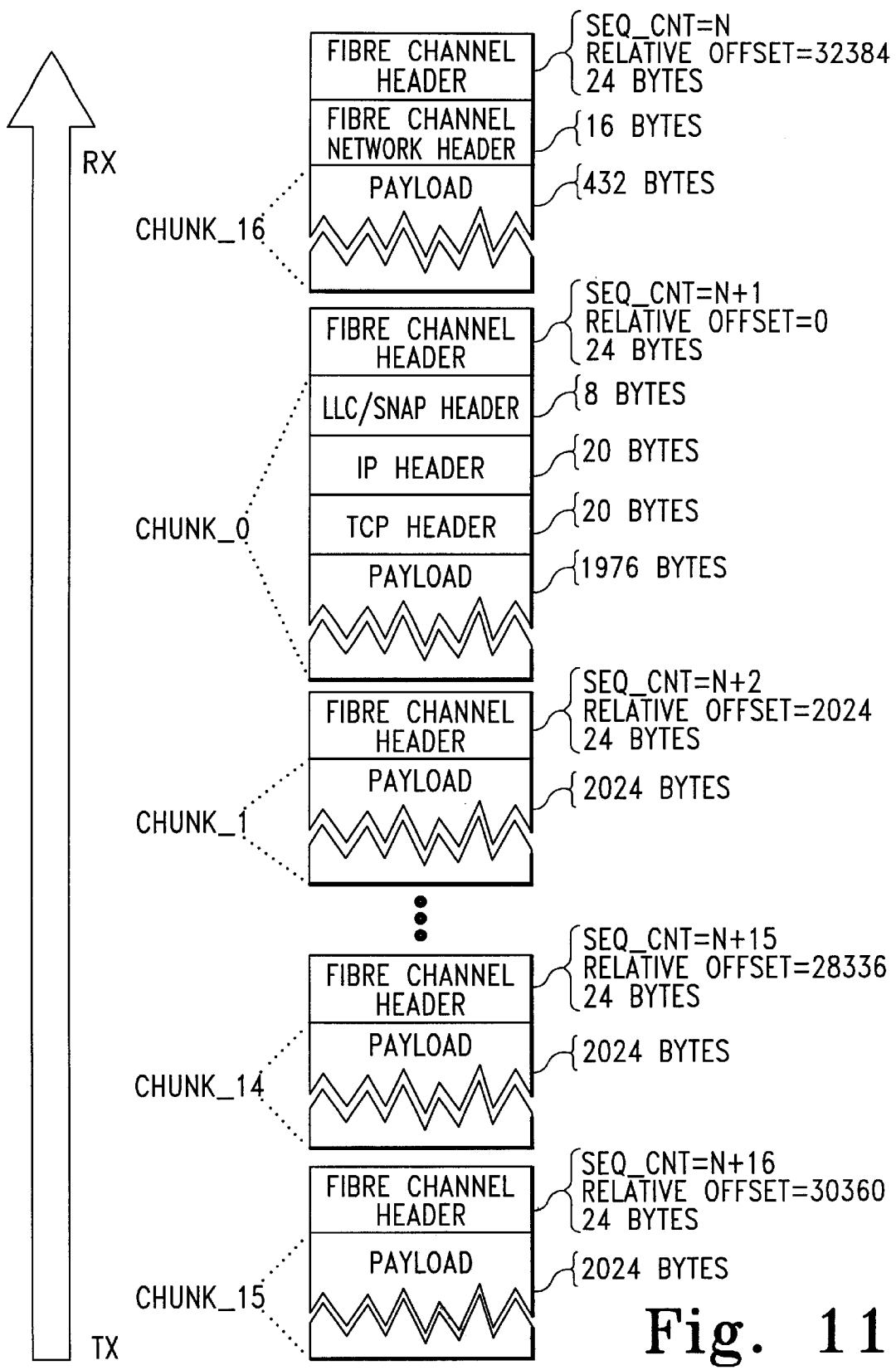
FIG. 11 shows a graphical representation of an alternate transfer method which utilizes features of the present invention.

Shown in FIG. 11 is a graphical representation of an alternate transfer method for transmitting a TCP/IP packet having a length of 32,816 bytes which enables a receiving device to efficiently allocate storage for the TCP/IP packet. In particular, the graphical representation shows that like the graphical representation of FIG. 9, the last portion CHUNK_16 is transferred in the first frame of the frame sequence. After transferring the last portion CHUNK_16, the first portion CHUNK_0 of the TCP/IP packet is transferred. Moreover, the remaining portions of the TCP/IP packet are transferred in order. In other words, the second portion CHUNK_1 through the second to last portion CHUNK_15 are transferred one after the other.

The advantage of the transferring the TCP/IP packet in the manner illustrated in FIG. 11 is that due to the nature of caching the first network card 20a may be able to obtain the TCP/IP packet from the first memory 16a in a more efficient manner by sequentially accessing the first memory 16a. However, the disadvantage of transferring the TCP/IP packet in the manner illustrated in FIG. 11 is that unless the first portion CHUNK_0 is transmitted as the last frame of the frame sequence, the first network card 20b is unable to generate the error detection code as the TCP/IP packet is transferred from the first memory 16b to the network 22.

It should be appreciated that the first network card 20a may transfer the last portion CHUNK_16 in the first frame of the frame sequence, transfer the first portion CHUNK_0 in the last frame of the frame sequence, and transfer the intermediate portions CHUNK_1 ... CHUNK_15 in order. In this manner, the first network card 20a may incorporate the advantageous features of the transfers illustrated in FIG. 9 and FIG. 11.

While the invention has been illustrated and described in detail in the drawings and foregoing description, such illustration and description is to be considered as exemplary and not restrictive in character, it being understood that only preferred embodiments have been shown and described and that all changes and modifications that come within the spirit of the invention are desired to be protected.

What is claimed is:

1. A method of processing a frame sequence used to transmit a data block that includes a first portion and a last portion, comprising the steps of:
    receiving a first frame of said frame sequence, said first frame including said last portion of said data block and a relative offset for said last portion, said relative offset indicating a relative displacement between said first portion of said data block and said last portion of said data block; and
    allocating a storage area for said data block, said storage area having a storage capacity that is based on said relative offset of said first frame.

2. The method of claim 1, further comprising the step of determining a byte count for said data block based upon said last portion of said data block and said relative offset, wherein said allocating step includes the step of allocating said storage capacity of said storage area based upon said byte count.

3. The method of claim 1, further comprising the step of determining a byte count for said data block based upon said last portion of said data block and said relative offset, wherein said allocating step includes the step of a casing said storage capacity of said storage area to be at least as large as said byte count.

4. The method of claim 1, further comprising the step of determining a byte count for said data block based upon said last portion of said data block and said relative offset, wherein:
    said allocating step includes the step of allocating an exact number of memory pages needed to store said data block, and
    said exact number of memory pages is based upon said byte count.

5. The method of claim 1, further comprising the step of: storing said last portion of said data block in said storage area at a location that is based upon said relative offset.

6. The method of claim 1, wherein said data block further includes a plurality of intermediate portions which are between said first portion of said data block and said last portion of said data block, further comprising the steps of:
    receiving a plurality of frames which include said first portion of said data block and said plurality of intermediate portions of said data block; and
    storing said first portion of said data block and said plurality of intermediate portions of said data block in said storage area.

7. The method of claim 1, wherein
    said data block is an IP packet, and
    said frame sequence is a Fibre channel frame sequence.

8. A method of using a frame sequence to transmit a data block from a transmitting device to a receiving device, comprising the steps of:
    generating a first frame of said frame sequence that includes a last portion of said data block and a relative offset which indicates a relative displacement between a first portion of said data block and said last portion of said data block;
    generating a second frame of said frame sequence that includes said first portion of said data block;
    transmitting said first frame of said frame sequence from said transmitting device to said receiving device before transmitting said second frame;
    receiving said first frame of said frame sequence from said transmitting device before receiving said second frame; and
    allocating a storage area for said data block, said storage area having a storage capacity that is based on said relative offset of said first frame.

9. The method of claim 8, further comprising the step of determining a byte count for said data block based upon said last portion of said data block and said relative offset, wherein said allocating step includes the step of allocating said storage capacity of said storage area based upon said byte count.

10. The method of claim 8, further comprising the step of determining a byte count for said data block based upon said last portion of said data block and said relative offset, wherein said allocating step includes the step of causing said storage capacity of said storage area to be at least as large as said byte count.

11. The method of claim 8, further comprising the step of determining a byte count for said data block based upon said last portion of said data block and said relative offset, wherein:
    said allocating step includes the step of allocating an exact number of memory pages needed to store said data block, and
    said exact number of memory pages is based upon said byte count.

12. The method of claim 8, further comprising the step of:
    storing said last portion of said data block in said storage area at a location based upon said relative offset.

13. The method of claim 8, wherein said data block further includes a plurality of intermediate portions which are between said first portion of said data block and said last portion of said data block, further comprising the steps of:
    generating a plurality of intermediate frames, each intermediate frame including a different intermediate portion of said data block; and
    transmitting said second frame and said plurality of intermediate frames from said transmitting device to said receiving device after said first frame transmitting step.

14. The method of claim 8, wherein said data block further includes a plurality of intermediate portions which are between said first portion and said last portion, further comprising the steps of:
    generating a plurality of intermediate frames, each intermediate frame including a different intermediate portion of said data block;
    transmitting said plurality of intermediate frames from said transmitting device to said receiving device after said first frame transmitting step; and transmitting said second frame from said transmitting device to said receiving device after said plurality of intermediate frames transmitting step.

15. The method of claim 8, wherein said data block further includes a plurality of intermediate portions which are between said first portion and said last portion, further comprising the steps of:

generating a plurality of intermediate frames, each intermediate frame including (i) a different intermediate portion of said data block, and (ii) a different relative offset for said different intermediate portion, said different relative offset indicating a different relative displacement between said first portion of said data block and said different intermediate portion of said data block;

transmitting said second frame and said plurality of intermediate frames from said transmitting device to said receiving device after said first frame transmitting step;

receiving said plurality of intermediate frames from said transmitting device after said allocating step; and storing said plurality of intermediate portions of said data block in said storage area at a different location for each intermediate portion, said different location being based upon said different relative offset for each intermediate portion.

16. The method of claim 8, wherein said data block comprises an IP packet, and said frame sequence comprises a Fibre channel frame sequence.

17. A network device for receiving a data packet transmitted in a frame sequence, comprising:

a network connector operable to (i) couple to a network, and (ii) receive said frame sequence from said network, said frame sequence including a first frame having a last portion of said data packet and a relative offset which indicates a relative displacement between a first portion of said data packet and said last portion of said data packet;

a storage device operable to store said data packet received by said network connector; and a controller coupled to said storage device and said network connector, said controller operable to (i) receive from said network connector said first frame of said frame sequence including said relative offset, and (ii) allocate a storage area of said storage device for said data packet, said storage area having a storage capacity that is based upon said relative offset.

18. The network device of claim 17, wherein said controller is further operable to (i) determine a byte count for said data packet based upon said last portion of said data packet and said relative offset, and (ii) allocate said storage capacity of said storage area based upon said byte count.

19. The network device of claim 17, wherein said controller is further operable to (i) determine a byte count for said data packet based upon said last portion of said data packet and said relative offset, and (ii) allocate an exact number of memory pages needed to store said data packet, said exact number of memory pages being based upon said byte count.

20. The network device of claim 17, wherein said data packet further includes a plurality of intermediate portions which are between said first portion of said data packet and said last portion of said data packet, said frame sequence further includes a plurality of frames which include said first portion of said data packet and said intermediate portions of said data packet, said network connector is further operable to receive said plurality of frames from said network, and said controller is further operable to (i) receive said plurality of frames from said network connector after allocating said storage area for said data packet, and (ii) cause said first portion of said data packet, said plurality of intermediate portions of said data packet, and said last portion of said data to be stored in said storage area of said storage device.

* * * * *